United States Patent [19]

Hinger

[11] Patent Number: 4,919,763

[45] Date of Patent: Apr. 24, 1990

[54] APPARATUS FOR CONVERTING SEWAGE SLUDGE FILTER CAKE BY PYROLYSIS

[75] Inventor: Klaus-Jürgen Hinger, Stuttgart, Fed. Rep. of Germany

[73] Assignee: Werner & Pfleiderer GmbH, Fed. Rep. of Germany

[21] Appl. No.: 73,816

[22] Filed: Jul. 15, 1987

[30] Foreign Application Priority Data

Jul. 23, 1986 [DE] Fed. Rep. of Germany ....... 3624877
May 29, 1987 [DE] Fed. Rep. of Germany ....... 3718133

[51] Int. Cl.$^5$ .......................... C10B 1/02; C10B 1/06
[52] U.S. Cl. .................................. 202/113; 202/118; 202/219
[58] Field of Search ............... 202/113, 116, 118, 133, 202/137, 217, 222; 159/25.1, 26.1; 48/111; 34/180, 183; 210/769, 770

[56] References Cited

U.S. PATENT DOCUMENTS 1,604,253 10/1926 Barnhart ............................ 202/118
2,078,914 4/1937 Daubert ............................. 202/118
3,997,406 12/1976 Arvanitakis ....................... 159/25.1

FOREIGN PATENT DOCUMENTS

3221495 12/1983 Fed. Rep. of Germany .

Primary Examiner—Joye L. Woodard
Attorney, Agent, or Firm—Laff, Whitesel, Conte & Saret

[57] ABSTRACT

The invention relates to an apparatus for converting sewage-sludge filter cakes into oil, gas and coke by pyrolysis. The apparatus has two dewatering stages—a preliminary evaporating stage and a residual evaporating stage, a conversion stage and a cooling stage. Each of the evaporating, converting and cooling stages are constructed with at least one module. Each module has a housing divided by walls into a transfer chamber at one end and a second chamber at the other end. The second chamber is divided between a feed chamber and a delivery chamber. Between the transfer chamber and the second chamber is a heat transfer chamber. In the heat transfer chamber there are a plurality of first tubes connecting the feed chamber to the transfer chamber and a plurality of second tubes connecting the transfer chamber to the delivery chamber. Conveyors are provided in each of the tubes to deliver solid feed material from the feed chamber to the first tubes into the transfer chamber and then from the transfer chamber to the delivery chamber where the matter is then fed to another module according to the desired treatment. The tubes are spaced apart from each other to permit a heat transfer medium to be fed into and out of the heat transfer chamber.

12 Claims, 7 Drawing Sheets

FIG. 10 ns. In addition, the known plant is not flexible with regard to different amounts of sewage sludge occurring and having to be processed.

APPARATUS FOR CONVERTING SEWAGE SLUDGE FILTER CAKE BY PYROLYSIS

FIELD OF THE INVENTION

The invention relates to a process for converting sewage-sludge filter cakes into oil, gas and coke by pyrolysis, wherein the filter cakes, still containing water, are comminuted, then largely dewatered by evaporation with the supply of heat formed at least partially by waste heat from at least one subsequent process step, then converted, while being circulated and conveyed and degassed and with the simultaneous supply of heat formed at least partially by waste heat from at least one subsequent process step, and afterwards cooled with recovery of heat.

The invention relates furthermore to a plant for carrying out this process, said plant having a comminuter, an evaporating apparatus and a converting apparatus.

BACKGROUND OF THE INVENTION

Sewage sludge is produced as an unwanted waste product during the purification of sewage in sewage purification plants. It was formerly recovered as manure in agriculture and today this still counts as the simplest and least expensive form of disposal. Agricultural utilization was greatly restricted as a result of the high contents of heavy metals in sewage sludge, particularly in sewage sludge from large communal sewage purification plants. In the meantime, the greater part of the sewage sludge is stored in dumps or burnt in combustion installations. The burning of sewage sludge is very expensive and pollutes the air by the emission of harmful substances. It is true that the dumping of sewage sludge is comparatively simple; but the expenses are constantly rising because the requirements with regard to the safety of depositing in dumps are constantly increasing.

German Offenlegungsschrift 32 21 495 shows a process and a plant of the type mentioned above, wherein sewage-sludge filter cakes coming from chamber filter presses are comminuted in a grinding and drying device and then fed to a rotary kiln for the conversion. This conversion is a pyrolysis process during which a low-temperature carbonization of the sewage sludge takes place with the complete or far-reaching exclusion of air. As a result of a so-called low-temperature pyrolysis, that is to say as a result of a conversion at temperatures around 320° C., gas containing oil and combustible coke are formed from the waste. The oil is extracted from the gas containing oil by condensation. The coke is burnt in a furnace; the hot flue gases produced in the course of this are used to heat the rotary conversion kiln and the grinding and drying device. The known process is not yet satisfactory with regard to the heat recovery, that is to say with regard to the energy balance of the whole process and with regard to the precision of conducting the process. In addition, the known plant is not flexible with regard to different amounts of sewage sludge occurring and having to be processed.

SUMMARY OF THE INVENTION

It is an object of the invention to provide a process of the type mentioned above which can be carried out particularly favourably with regard to the energy balance and with regard to the precision of conducting the process.

It is a further object of the invention to provide a plant of the type mentioned above which is particularly simple in construction and particularly versatile in use.

According to the invention the dewatering of the filter cakes is effected in two stages, a preliminary evaporation first being carried out under partial vacuum and then a residual evaporation at atmospheric pressure, and at least during the dewatering and during the conversion, the filter cakes are subjected to a forced conveying and forced circulation in defined partial streams.

According to an alternative solution of the above-mentioned problems the dewatering of the filter cakes is effected in two stages, a preliminary drying first being carried out by evaporation of the water and then a residual evaporation at atmospheric pressure, and at least during the dewatering and during the conversion, the filter cakes are subjected to forced conveying and forced circulation in defined partial streams.

As a result of the division of the dewatering of the sewage-sludge filter cakes into two stages, the waste heat which originates from the second stage, the evaporation under normal pressure and correspondingly high temperatures and which otherwise cannot be utilized can be used for a preliminary drying under vacuum or alternatively for a preliminary drying by evaporation generally at atmospheric pressure. As a result of the forced conveying and forced circulation in defined component streams, the effect is achieved that the individual portions of sewage sludge are fed uniformly to the heat-exchanging surfaces as a result of which a particularly uniform heat exchange is achieved in a particularly short time and as a result of which, overheating in particular, is prevented. Unwanted aromatic compounds might actually result from overheating during the conversion process.

The coke resulting at the end of the process can be gasified in a further process step, the resulting gas again being used for the hot gas production, that is to say to produce the heat necessary for the conversion and dewatering. The coke can also be removed and used for other heating purposes outside the process. The ash produced during the gasification of the coke or the coke produced is partially supplied to the comminuting process, as a result of which a certain heating up takes place there already and as a result of which an adjustment of the sewage-sludge filter cake to a desired optimum composition and an optimum moisture content for the comminution is possible.

The oil produced can again be used elsewhere or be used directly for the generation of current in diesel generator sets.

The plant according to the invention has as an essential feature that it is of modular construction, all the modules being alike. The individual apparatuses necessary for the vacuum preliminary evaporation, the residual evaporation, the conversion, possibly for the coke gasification and for the recooling of the solids are constructed from these modules and the number of individual modules for an individual apparatus can decrease as the volume decreases as a result of the extraction of water. Furthermore, these modules are adapted to be assembled to form plants of different sizes so that an exceptionally flexible system is provided by this modular form of construction. It may be expressly put on record here that these modules can be used not only for carrying out the process according to the invention but in general when a heat transfer is necessary from or to solids which are difficult to convey so that the relative expense for the forced conveying members provided in each individual tube is justified. To this extent, the invention is not restricted to the use of these modules in plants for carrying out the process according to the invention but also relates to the general use of these modules as heat transmitters.

If each module comprises tubes arranged parallel to one another in a housing, which tubes are preceded by a feed chamber and followed by a delivery chamber, the assembly of a plurality of modules to form an apparatus is rendered possible or facilitated.

The common drive of all the conveying members of a module is rendered possible in particularly simple manner. Gentle conveying and circulation of the sewage-sludge filter cakes without these being exposed to shearing in an inappropriate manner is rendered possible, since, with shearing, unwanted lump formation occurs.

Furthermore, assurance is provided that the entry of the sewage-sludge filter cakes into the tubes and the transfer from one layer of tubes to the next layer of tubes and the discharge are reliably ensured.

Further advantages and features of the invention will become apparent from the ensuing description of two exemplary embodiments, taken in conjunction with the drawings.

DESCRIPTION OF THE PREFERRED EMBODIMENTS

Figure 1:
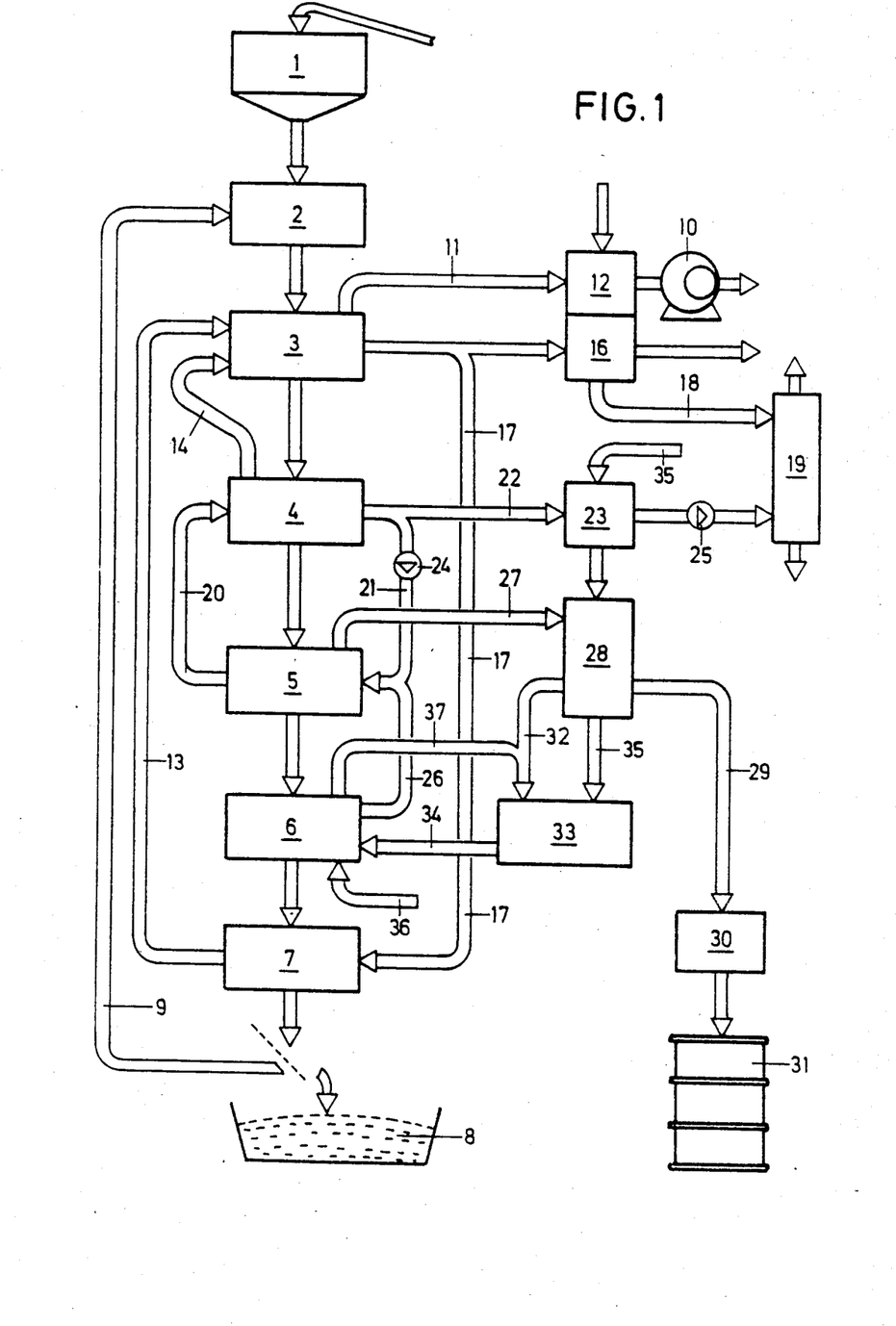
FIG. 1 diagrammatically shows a plant according to the invention for carrying out the process according to the invention.

As can be seen from FIG. 1, a bin 1 for sewage-sludge filter cakes, a mixer and comminuter 2 for the filter cakes, a vacuum preliminary evaporating apparatus 3, a residual evaporating apparatus 4, a conversion apparatus 5, a coke gasification apparatus 6 and a cooling apparatus 7 for solids are arranged in succession. The path, the conveying and the conveying direction through these apparatuses are indicated by double-line arrows in each case. Sewage-sludge filter cakes with about a 40% content of dry substances, for example from a chamber filter press, are supplied to the bin 1. From there they are transferred into the mixer and comminuter 2 and after a mixing and comminuting process, during which ash or coke is added, they are fed to the vacuum preliminary evaporating apparatus 3. The vacuum preliminary evaporation is effected at a pressure of about 3 kPa and a temperature of about 25° C. A pressure range from 3 to 10 kPa may be considered, that is to say a temperature range from 25° to 45° C.

In the course of this, the proportion of dry substances in the filter cake is increased to about 45 to 50%.

This filter cake then enters the residual evaporating apparatus 4 where a residual evaporation is effected under normal pressure so that the emerging filter cake has a porportion of 95% dry substances.

This filter cake is then transferred into the conversion apparatus 5 in which a so-called low-temperature conversion of the sewage-sludge filter cake, which now has a low water content, is effected with the supply of heat. This low-temperature conversion is effected at about 320° C. In the course of this, pyrolysis gas and coke are formed as decomposition products. The coke, as a solid, is then transferred into the coke gasification apparatus where heating gas is produced in the usual manner with the supply of air or oxygen and water vapour with the simultaneous supply and generation of heat. The resulting ash is fed to the cooling apparatus 7 for solids and cooled. The coarse ash is collected in a container 8 and taken to a dump. A small proportion of the ash, namely the ash component with a small particle size, is fed, via a solids conveying conduit 9, to the mixer and comminuter 2 so that there, too, a partial preheating of the filter cakes to be treated is effected already. If the coke gasification apparatus 6 is omitted, the apparatus 7 for cooling solids then serves for the coke cooling and the coke is then collected in the container 8. Here, too, some of the coke may be fed to the mixer and comminuter 2 via the solids conveying conduit 9.

Hot coke or—if the coke is gasified—hot ash, with a temperature of about 150° C. in either case, is fed to the mixer and comminuter 2 for the partial preheating of the filter cake to be treated and is mixed with the sewage-sludge filter cakes. In the course of this, a combined temperature of about 80° C. results without the mixer and comminuter 2 having to be separately preheated. Coke is preferably added to the sewage-sludge filter cakes because a more effective preliminary drying of the sewage sludge is achieved by this means. In this case, the coke gasification apparatus 6 is omitted—as already mentioned.

The reduced pressure necessary in the vacuum preliminary evaporating apparatus 3 is produced by a vacuum pump 10, usually a water ring pump. The vapours formed during this preliminary evaporation are drawn off by means of the vacuum pump 10 through a vacuum pipe 11 and through a condenser 12. The emerging condensate is supplied to the sewage purification plant as sewage.

The heat necessary for the vacuum preliminary evaporation is supplied by means of hot water from the apparatus 7 for cooling solids and by means of vapours from the residual evaporating apparatus 4. For this purpose, a hot-water pipe 13 connecting the apparatus 7 for cooling solids to the vacuum preliminary evaporating apparatus 3 is accordingly provided and a vapour pipe 14 connecting the residual evaporating apparatus 4 to the vacuum preliminary evaporating apparatus 3 is accordingly provided. Hot water and vapours each have a temperature of about 100°. A small proportion of the warm water at about 70° leaving the vacuum preliminary evaporating apparatus is supplied, via a warm-water removal pipe, to a cooler 16 and from there is conveyed further, as sewage, into a sewage purification plant. The greater proportion of the warm water is again supplied, via a return pipe 17, to the apparatus 7 for cooling solids where it is again heated and supplied, as hot water, via the pipe 13, to the vacuum preliminary evaporating apparatus 3. The condenser 12 and the cooler 16 are connected in series, in this order, in a cooling-water line 18. This cooling water is supplied to a flue-gas scrubber 19.

The heat necessary for the residual evaporation is supplied to the residual evaporating apparatus 4 from the conversion apparatus 5 via a medium-temperature flue-gas pipe 20. The flue-gases leaving the apparatus 4 and cooled to about 300° C. are partially recycled to the conversion apparatus 5 through a flue-gas return pipe 21. The remaining proportion is supplied, via a flue-gas removal pipe 22, to an air preheater 23 and there supplied to the flue-gas scrubber 19 after surrendering the residual heat to the air. Pumps 24, 25 may be connected, to the necessary extent, in the flue-gas return pipe 21 and the flue-gas removal pipe 22.

The heat necessary for the low-temperature conversion is supplied in the form of hot flue gases from the coke gasification apparatus 6 via a high-temperature flue-gas pipe 26. These high-temperature flue gases are mixed with the low-temperature flue gases recycled via the pipe 21 so that the desired combined temperature is reached. During the low-temperature carbonization of the largely dry sewage-sludge filter cake, this is converted into coke with the release of vapours containing oil. The vapours containing oil, the pyrolysis gas, are supplied via a pyrolysis-gas pipe 27, to an oil condenser 28. The oil obtained during the condensation process is supplied, via an oil pipe 29 and an oil cooler 30, to an oil store 31. The combustible gas formed is drawn off via a gas pipe 32 and supplied to a hot-gas producer where it is burnt. The flue gases formed are conveyed, via a flue-gas pipe 34, to the coke gasification apparatus 6. The combustion air necessary in the hot-gas producer 33 is supplied via an air pipe 35 which is taken through the air preheater 23 and the oil condenser 28 so that it is used there for cooling the flue gases or pyrolysis gas in each case, with simultaneous heating.

The heat necessary for the coke gasification is supplied—as already indicated—from the hot-gas producer 33, via the flue-gas pipe 34 in the form of flue gas at a temperature of about 850° C. The air or the oxygen further necessary for the gasification on the one hand and the steam necessary on the other hand are introduced into the coke gasification apparatus 6 via an air-steam pipe 36.

If no coke gasification is to be effected and therefore the coke gasification apparatus 6 is omitted, the hot flue gases emerging from the hot gas producer 33 are conveyed directly to the conversion apparatus 5. In addition, a heating-gas pipe 37, which conveys the combustible gases formed during the coke gasification to the hot-gas producer 33, is not necessary.

Figure 2:
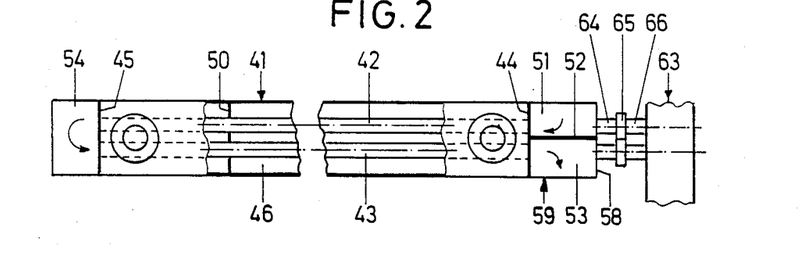
FIG. 2 shows a module for the construction of the individual apparatuses of the plant according to the invention, in a lateral longitudinal view, partly broken away.
Figure 3:
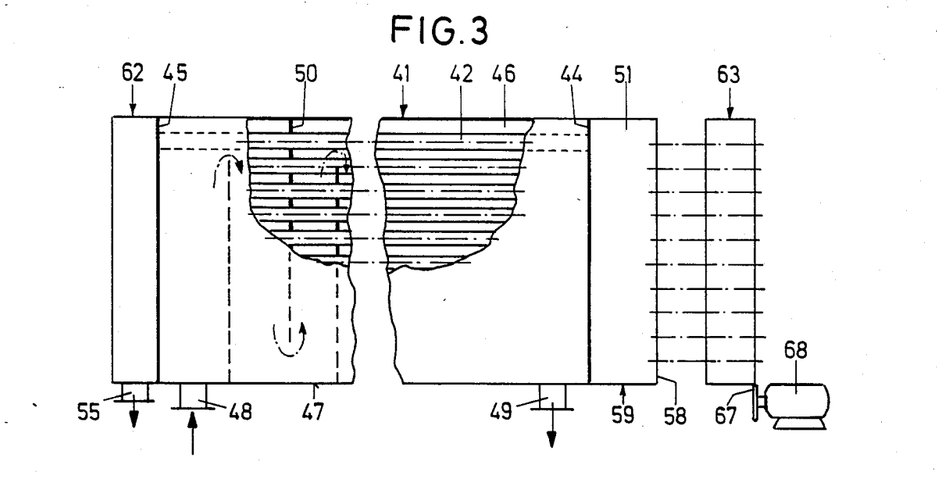
FIG. 3 shows a plan view of the module of FIG. 2, in an illustration partially broken open.

The apparatuses 3 to 7 are designed as tube package apparatuses of modular construction. Such a module is illustrated in FIGS. 2 and 3. It comprises a substantially parallelepiped central heat transfer tube housing 41, transfer housing 62 and delivery housing 59. The tube housing 41 has first tubes 42 and second tubes, 43 arranged parallel to one another in two horizontal planes. The tubes 42, 43 have first and second ends and are held at their second ends in end wall 44 and their second ends in end wall. These end walls, 45 define a heat-exchange space or chamber 46 into which an inlet socket 48 and an outlet socket 49 lead from a side wall 47 parallel to the tubes 42, 43. Partitions 50 are inserted in the manner of baffle plates in the heat-exchange space 46 so that the medium entering through the inlet socket 48 flows through the heat-exchange space 46 with a plurality of deflections in crosscurrent to the tubes 42, 43 or the solid material conveyed in these. A feed chamber 51 for the solids is at one side—the right-hand side in FIGS. 2 and 3. The second ends of the tubes 42 open into the feed chamber 51, FIG. 4. Below this feed chamber and separated from it by a plate 52 is a delivery chamber 53. The second ends of the tubes 43 open into the delivery chamber 53.

Formed at the side of the tube housing 41 opposite to the chambers 51, 53, that is to say beyond the end wall 45, is the transfer housing 62 defining a chamber 54. The first ends of the tubes 42 and 43 open into the transfer chamber 54, FIG. 5. Thus the solid matter emerging from the upper or first tubes 42 into the upper portion of the transfer chamber 54 and falls down and is transferred into the lower or second tubes 43. Leading out of the transfer chamber 54 is a gas socket 55 which is mounted in a side wall, for example the side wall 47. The gas forming in the tubes 42, 43 during the treatment is drawn off through this socket 55.

Disposed in all the tubes 42, 43 are conveyor members 56 which can be driven continuously and convey continuously. These conveyor members are mounted—as can be seen from FIG. 4—in corresponding bearings 57 in an end wall 58 of the feed and delivery housing 59 and extending into the feed chamber 51 and the delivery chamber 53. As can likewise be seen from FIG. 4, this housing 59 is attached by screws to the end wall 44.

Figure 5:
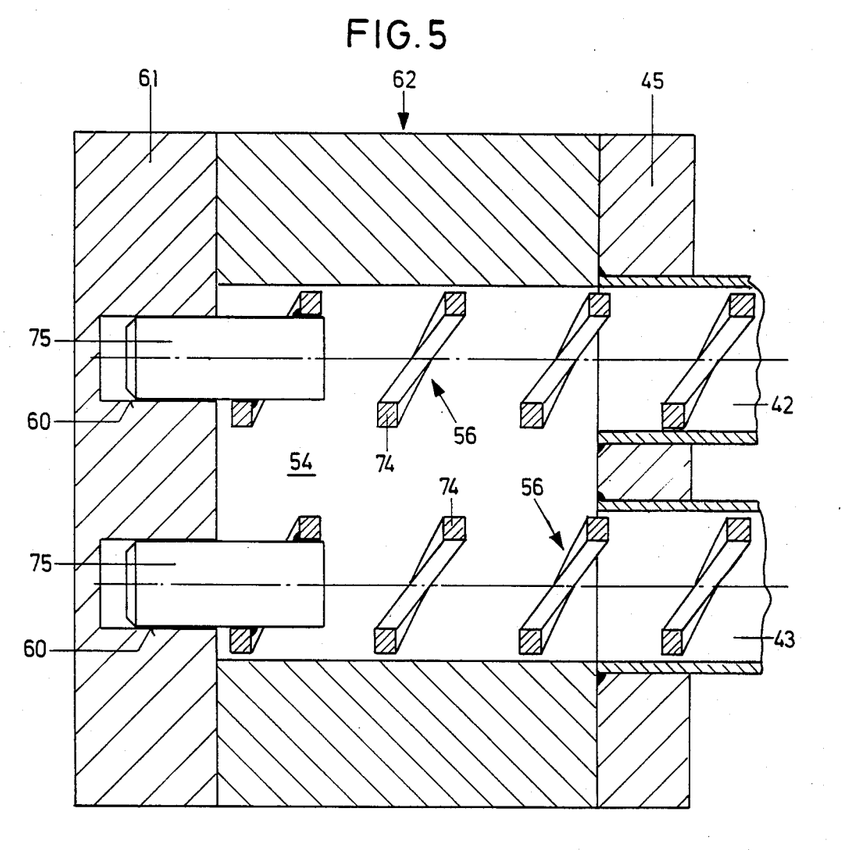
FIG. 5 shows a partial section through the module of FIG. 2 in the transfer region in a greatly enlarged illustration in comparison with FIG. 2.

At their other end, FIG. 5 the conveyor members 56 are mounted for free rotation in bearings 60 in an outer end wall 61 of the transfer housing 62 and extend into the transfer chamber 54.

The conveyors 56 deliver material from the feed chamber 51 into the first tubes 42 which in turn deliver the material through the heat exchange chamber 46 and to the transfer chamber 54. The material is their conveyed from the transfer chamber 54 by the conveyors through the second tubes 43 and again through the heat exchange chamber 46 to the delivery chamber 53.

The drive of all the conveyor members 56 belonging to one module, that is to say disposed in a housing 41, is effected jointly through a drive unit 63. This drive unit is disposed in front of the feed and delivery housing 59—as can be seen from FIGS. 2 and 3. The corresponding drive shaft journals 64 of the individual conveyor members 56 are taken through, out of the bearings 57 in the end wall 58 and connected to the driven shafts 66 of the drive unit 63 through corresponding couplings 65.

Figure 6:
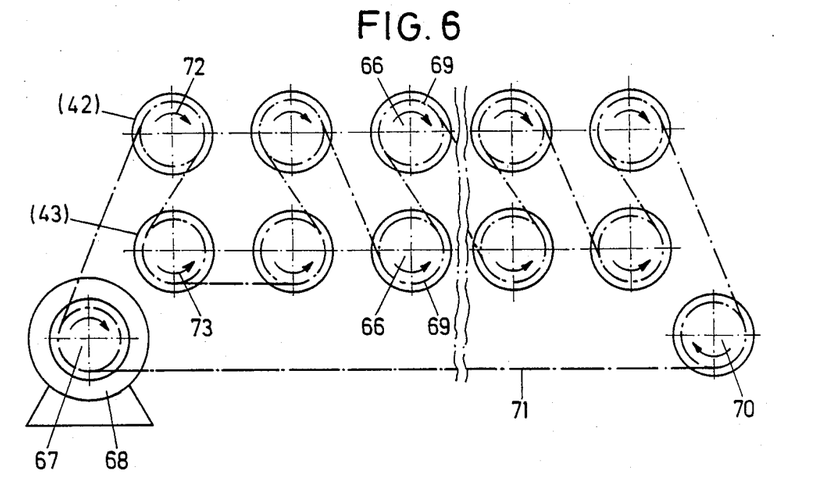
FIG. 6 shows an end view of a drive unit, illustrated diagrammatically.

As can be seen from FIG. 6, the driven shafts 66 are driven from a common drive wheel 67 which in turn is driven by a motor 68. Fitted to each driven shaft 66, for rotation therewith but not in relation thereto, is a chain wheel 69. A common driving chain 71 is taken round the drive wheel 67, which is constructed in the form of a corresponding chain wheel, and a tension wheel 70 and all the chain wheels 69. The chain is always taken alternately round a chain wheel 69 of a conveyor member 56 in a tube 42 and a chain wheel 69 of a conveyor member 56 in a tube 43 so that the direction of rotation 72 of the conveyor members 56 in the tubes 42 is opposite to the direction of rotation 73 of the conveyor members 56 in the tubes 43. As a result of this, it is possible to make the conveyor members 56 in both tubes 42 and 43 identical in construction. Despite this, the conveying in the upper layer of tubes 42 is effected from the feed chamber 51 to the transfer chamber 54 and in the lower layer of tubes 43 from the transfer chamber 54 to the delivery chamber 53. Naturally, the direction of rotational drive may also be identical for all the conveyor members 56 if these have a different pitch in the tubes 42 and 43 and so have a different conveying direction with the same direction of rotation when they leave the factory.

Figure 4:
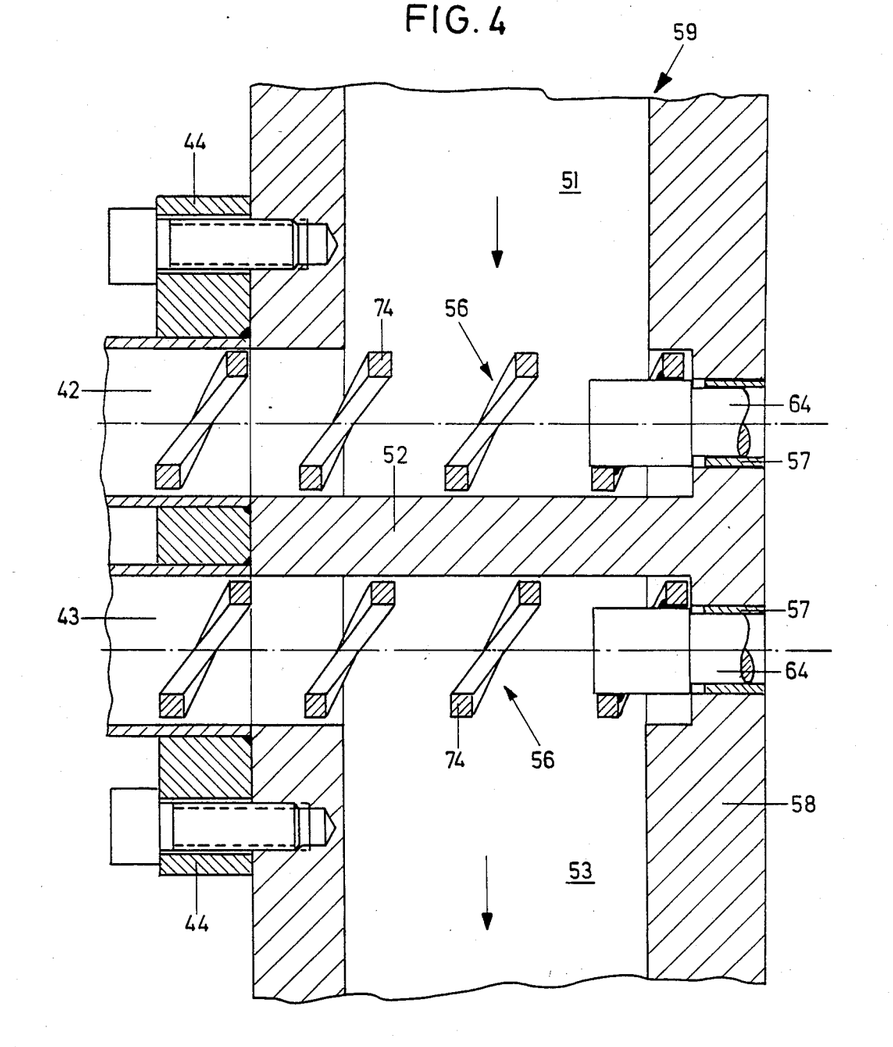
FIG. 4 shows a vertical partial section through the module of FIG. 2 in the feed and delivery region, in a greatly enlarged illustration in comparison with FIG. 2.

In the embodiment shown in FIGS. 4 and 5, coreless screw conveyor members 74 are provided as conveyor members 56 and are wound like a helical spring from square bar material with a square cross-section. Such coreless screw conveyor members can be bent or wound in the same manner from round bar material or rectangular bar material or material with a trapezoidal cross-section. At their ends mounted in the transfer housing 62, these screw conveyor members 74 comprise journals 75 which are mounted in the bearings 60 for free rotation with axial play. At the side adjacent to the drive unit 63, these screw conveyor members 74 are each provided with the corresponding drive shaft journal 64.

Figure 7:
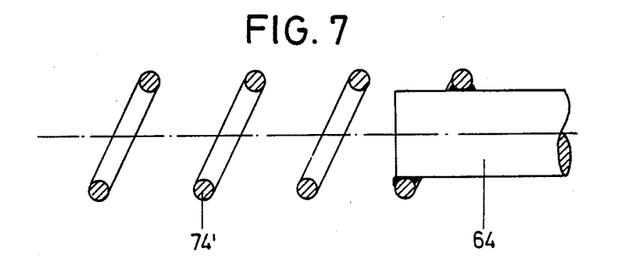
FIG. 7 shows a partial illustration of a conveying member.
Figure 8:
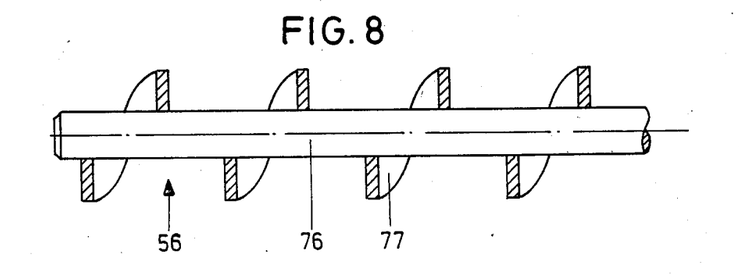
FIG. 8 shows a partial illustration of another conveying member.

Partially illustrated in FIG. 7 is a screw conveyor member 74' already mentioned which is wound from round bar material. Finally, a portion of a conveyor member 56 is illustrated in FIG. 8 which has a cylindrical core 76 extending over the whole length onto which a screw 77 of sheet metal is welded. If, with this formation, the conveyor members 56 as a whole are too long for orderly manufacture, individual lengths can be joined together in the usual manner by means of sleeve couplings.

What is decisive for the conveyor members is that a gentle conveying should be effected in order that the shearing stress of the filter cake may be kept as low as possible. The higher the shearing stress of the filter cake, the greater the unwanted and disturbing formation of lumps therein.

Figure 9:
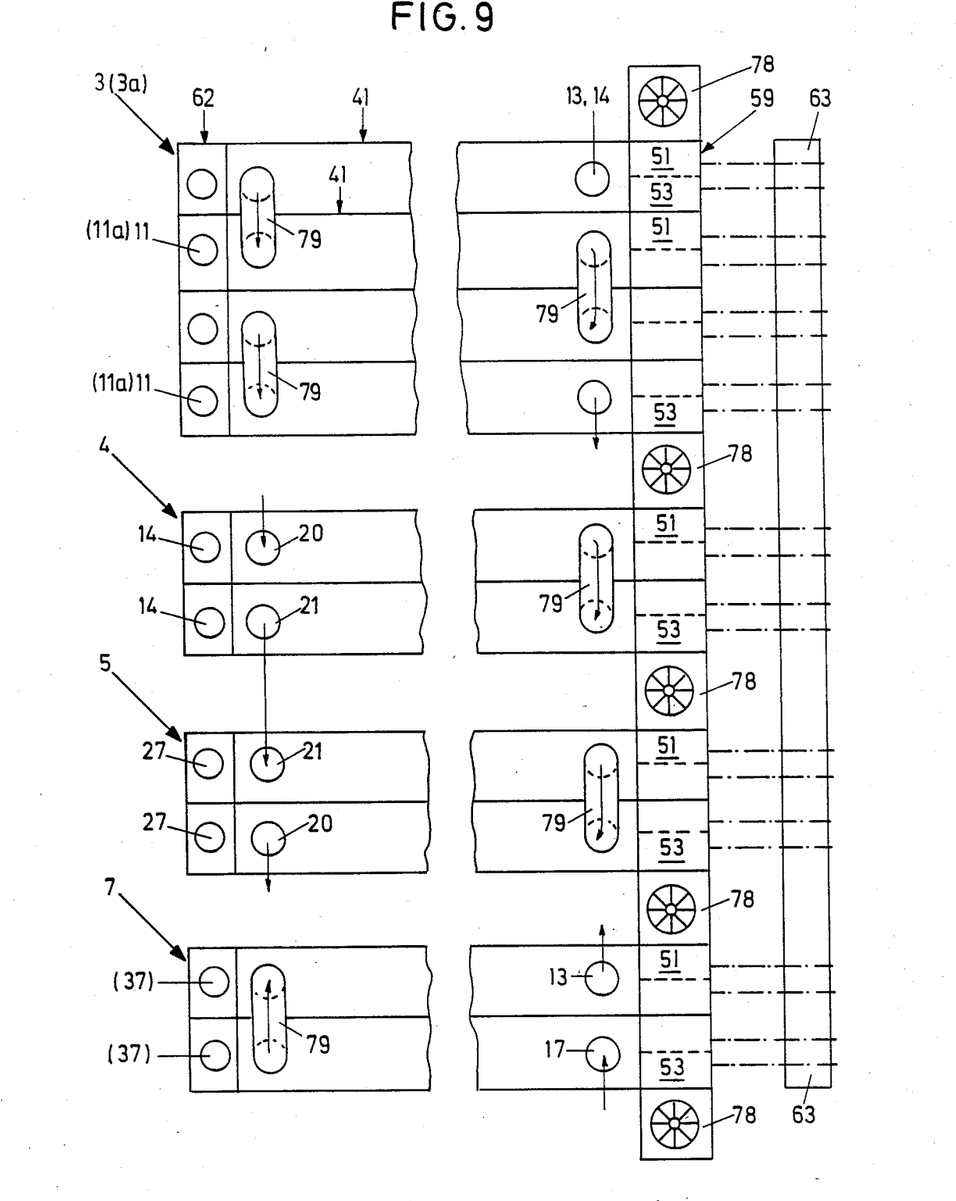
FIG. 9 shows a portion of the plant of FIG. 1, the individual apparatuses being composed of modules as shown in FIGS. 2 to 6.

From FIG. 9 it can be seen how a plant such as is illustrated in FIG. 1 can be built up from the individual modules. For reasons of clarity, the coke gasification apparatus 6 is omitted in FIG. 9. The vacuum preliminary evaporating apparatus 3 is composed of four modules which are placed one on top of the other so that a delivery chamber 53 leads into the feed chamber 51 of the following module each time. Each apparatus 3, 4, 5 or 7 is preceded by a lock 78 which may be connected directly to the last delivery chamber 53 of the preceding apparatus. The reference numerals for the pipelines described above in connection with FIG. 1 are shown at the sockets 48, 49, 55. Apart from this, the fact that the inlet sockets 48 and the outlet sockets 49 are connected to one another by means of short connecting pipes 79 is illustrated.

Increases in throughput are achieved by increasing the speed of rotation of the conveyor members 56 and/or by connecting modules (housings 41) in parallel, while increases in the sojourn time of the filter cakes in the individual apparatuses 3, 4, 5, 6, 7 are achieved by reductions in speed of rotation and/or by series connection of modules, that is to say by laying them one above the other. The latter is illustrated in FIG. 9.

The low-temperature conversion is effected at temperatures between 250° and 330° C., preferably at 320° C. The tubes 42, 43 have lengths between 4 and 7 m and are preferably 6 m long. Their internal diameter should be in the range from 60 to 100 mm and preferably in the region of 80 mm. The locks 78 are preferably constructed in the form of rotary vane locks and serve primarily to prevent the uncontrolled flow of the gases serving for the treatment in the tubes from one apparatus into the next.

Figure 10:
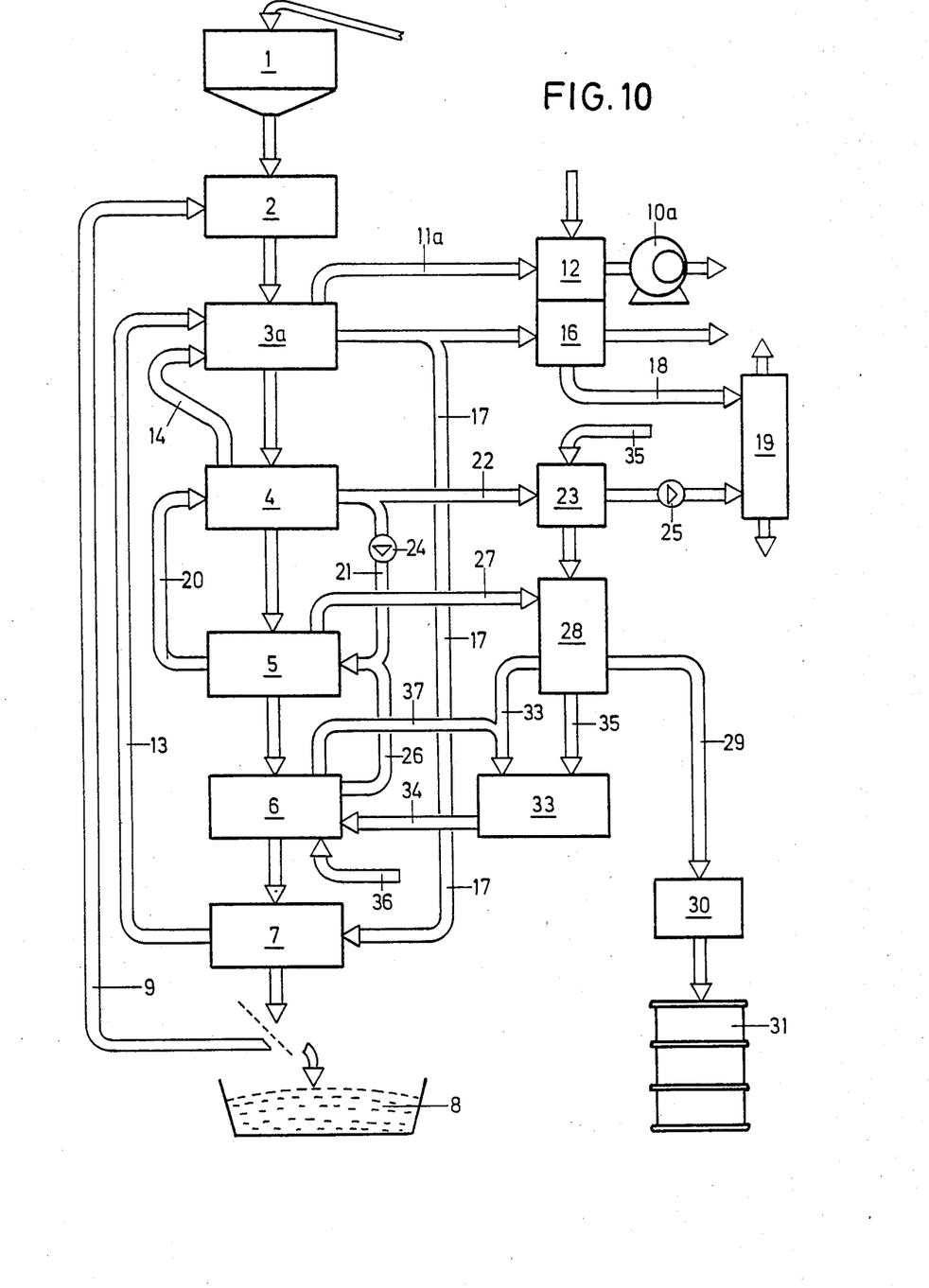
FIG. 10 shows a modified embodiment of a plant according to the invention.

As can be seen from FIG. 10, instead of a vacuum preliminary evaporating apparatus 3, an evaporating apparatus 3a may be provided which is connected, via a pipe 11a, to a blower 10a and a condenser 12. In this embodiment, in which the evaporating apparatus 3a is constructed in the same manner as described above, a stream of air is conveyed, by means of the blower 10a, over the filter cake which, as in the example of execution outlined previously, has been comminuted in the mixer and comminuter 2 and mixed with ash or coke in the ratio of 1:2. This stream of air produced by the blower 10a reduces the partial pressure of the water vapour over the filter cake present in the evaporating apparatus 3a, so that this cake slowly dries. This evaporation takes place at a partial pressure of the water vapour of about 30 kPa and a temperature of about 70° C. A water-vapour partial-pressure range from 10 to 70 kPa may be considered, that is to say a temperature range from 45° to 90° C. In the course of this the proportion of dry substance in the filter—ignoring the admixed dry components such as coke or ash—is increased from about 40% (initial state before the filter cake is fed into the mixer and comminuter 2) to almost 60%. This preliminary drying in the evaporating apparatus 3a is effected at atmospheric pressure. The moisture conveyed away in the stream of air is condensed out in the condenser 12. Otherwise, the plant is precisely the same as that described in FIG. 1 so that reference should be made to the preceding description. The same applies with regard to the process used.

Both processes described use, in the first step, a conversion of the water into a gaseous phase at temperatures below the boiling temperature at atmospheric pressure, and in one case the boiling point of the water is lowered by pressure reduction under partial vacuum while in the other case an intensified evaporation is brought about by conveying away the evaporated water in the stream of air, that is to say by reducing the water-vapour partial pressure.

What is claimed is:

1. An apparatus for converting sewage-sludge filter cakes to coke by pyrolysis which comprises a comminuter, a preliminary evaporating means, a residual evaporating means and a coke converting means, each of said preliminary evaporating means, said residual evaporating means, and said coke converting means being constructed with at least one module;

each of said modules having walls to define a central heat transfer tube chamber, a transfer chamber connected to the tube chamber at one end of the tube chamber and an upper feed chamber and a lower delivery chamber connected to the tube chamber at the other end of the tube chamber;

a plurality of first tubes and a plurality of second tubes mounted in and extending through said tube chamber, each first and second tubes having a first end and a second end, said first ends of said first tubes connected to and opening into said transfer chamber, said second ends of said first tubes connected to and opening into said upper feed chamber;

said first ends of said second tubes connected to and opening into said transfer chamber, said second ends of said second tubes connected to and opening into said lower delivery chamber;

a first coreless screw conveyor member mounted in each of said first tubes to deliver material by said first tubes from said upper feed chamber to said transfer chamber;

a second coreless screw conveyor member mounted in each of said second tubes to deliver material by said second tubes from said transfer chamber to said delivery chamber; wherein said first and second tubes mounted in and extending through said tube chamber are spaced apart so as to permit passage of a heat transfer medium around said first and second tubes to provide heat exchange between the medium and said first and second tubes, and said tube chamber includes a heat transfer medium inlet and a heat transfer medium outlet.

2. The apparatus of claim 1 comprising a cooling means, said cooling means being constructed with a least one of said modules; wherein said plurality of first tubes in each said module are mounted in a substantially parallel row located in an upper portion of the tube chamber, and said second tubes are mounted in a substantially parallel row located in a lower portion of the tube chamber.

3. The apparatus of claim 2 wherein said preliminary evaporating means is constructed with four of said modules.

4. The module of claim 2 wherein the internal diameter of each of the first and second tubes is 60 to 100 mm and the length of each of the first and second tubes is 4 to 7 m.

5. The apparatus according to claim 1, wherein the conveyor members (56) mounted in the first and second tubes (42, 43) are driven by a common drive unit (63).

6. The apparatus according to claim 1 wherein the conveyor members (56) project at least partially into the transfer, feed and delivery chambers (51, 53, 54).

7. The apparatus according to claim 1, wherein the internal diameter of each of the first and second tubes (42, 43) is 60 to 100 mm.

8. The apparatus according to claim 1, wherein the length of each of the first and second tubes (42, 43) is 4 to 7 m.

9. The apparatus according to claim 3, wherein the conveyor members (56) mounted in the first and second tubes (42, 43) are driven by a common drive unit (63).

10. The apparatus according to claim 3 wherein the conveyor members (56) project at least partially into the transfer, feed and delivery chambers (51, 53, 54).

11. The apparatus according to claim 3, wherein the internal diameter of each of the first and second tubes (42, 43) is 60 to 100 mm.

12. The apparatus according to claim 3, wherein the length of each of the first and second tubes (42, 43) is 4 to 7 m.

* * * * *